No. 721,276. PATENTED FEB. 24, 1903.
E. G. BATES.
NUMBERING OR SIMILAR MACHINE.
APPLICATION FILED MAR. 29, 1902.
NO MODEL. 2 SHEETS—SHEET 1.
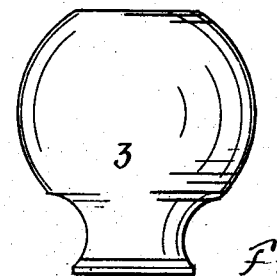
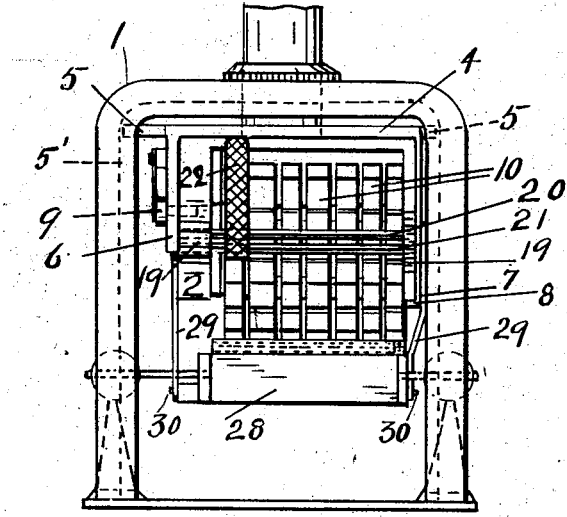
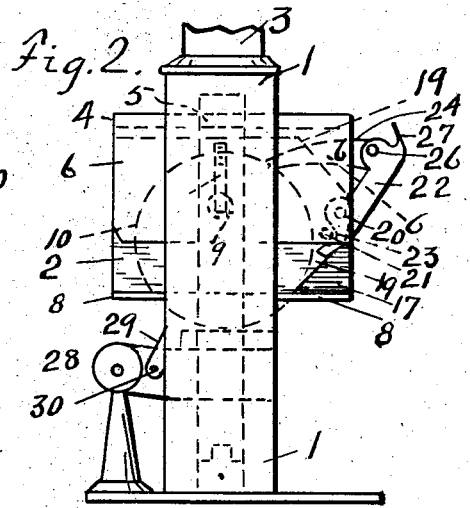
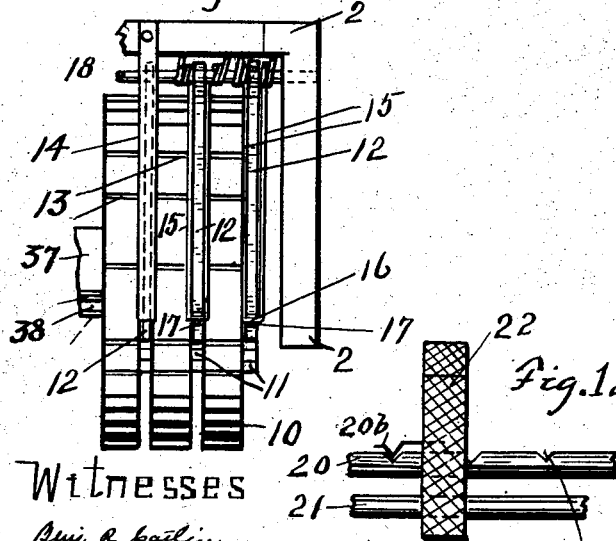
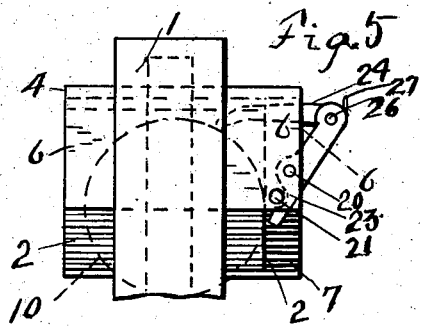
Witnesses
Benj. R. Catlin
A. H. Mater
Inventor
E. G. Bates
By Charles M. Catlin,
Attorney No. 721,276. PATENTED FEB. 24, 1903.
E. G. BATES.
NUMBERING OR SIMILAR MACHINE.
APPLICATION FILED MAR. 29, 1902.
NO MODEL. 2 SHEETS—SHEET 2.
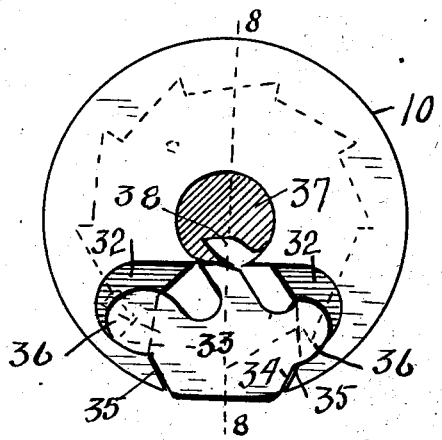
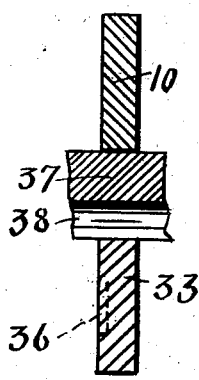
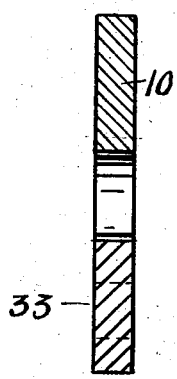
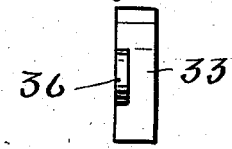
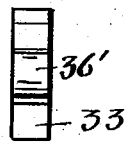
Witnesses
A. H. Mater
Benj. R. Catlin
Inventor
E. G. Bates
By Charles M Catlin
Attorney

UNITED STATES PATENT OFFICE.

EDWIN G. BATES, OF NEW YORK, N. Y., ASSIGNOR TO THE BATES MACHINE COMPANY, OF NEW YORK, N. Y., A CORPORATION OF NEW JERSEY.

NUMBERING OR SIMILAR MACHINE.

SPECIFICATION forming part of Letters Patent No. 721,276, dated February 24, 1903.

Application filed March 29, 1902. Serial No. 100,557. (No model.)

*To all whom it may concern:*

Be it known that I, EDWIN G. BATES, a resident of New York, in the county of New York and State of New York, have invented certain new and useful Improvements in Numbering or Similar Machines; and I do hereby declare the following to be a full, clear, and exact description of the invention, such as will enable others skilled in the art to which it pertains to make and use the same.

This invention relates to numbering and similar machines; and the main object of the invention is to provide improved wheels and means for controlling them.

In the accompanying drawings, Figure 1 is a side view, and Fig. 2 a view at right angles thereto, of a machine embodying the improvements. Fig. 3 is a partial side view of the printing-head looking from the opposite side to that shown in Fig. 1. Fig. 4 is a plan view of a printing-wheel-operating device. Fig. 5 shows a modification. Fig. 6 is a section on line 6 6 of Figs. 2 and 5. Fig. 7 is a side view showing an improved drop-cipher and means for supporting it in its wheel. Fig. 8 is a vertical section on line 8 8 of Fig. 7. Fig. 9 is an edge view of the drop-cipher block. Fig. 10 is a central vertical sectional view of a modified wheel. Fig. 11 is an edge view of a modified drop-cipher block, and Fig. 12 shows a modification.

The present improvements are shown in a machine similar to the hand numbering-machine disclosed in the patent granted me June 11, 1901, No. 676,084—namely, a hand-machine frame the head of which is removable and adapted also for use in a printing-press with or without surrounding type. The improvements are, however, not confined to use in numbering-machines having said adaptability.

In the drawings, 1 is the frame of a hand-machine, which supports a printing-head 2 by handle 3 and plate 4, having lugs 5, which move up and down in the groove 5' of frame 1, and depending flanges 6 7, the latter having a ledge 8, as in said patent.

9 is a spring-pressed pin for locking the head in position.

10 represents printing-wheels, on the peripheries of which are engraved figures, letters, or other devices, as common in this class of machines.

Between adjacent wheels are shown thin washers 11, which are preferably provided with ratchet-teeth. These are or may be utilized in turning the wheels and also for engagement by the pawls 12 for preventing accidental movement of the wheels. I prefer, however, to provide the peripheries of the printing-wheels themselves with teeth 13 to be engaged for advancing the wheels when the improved wheel-advancing device hereinafter described is used.

In Fig. 3 the pawl 12 at the left is shown with a flat spring 14, supported from the frame of head 2, as common. It is found advantageous in some cases, particularly in connection with the holding-pawls of the units and tens wheels, (they being most used,) to mount and form the springs and the pawls as in Fig. 3—that is, the springs are made of spring-wire having two members 15 parallel with the pawls, said members being connected at their outer ends by transverse members 16, which bear on the holding-pawls near their free ends, preferably within notches 17 in the backs of the pawls. Said notches lower the outer ends of the springs, so that both longitudinal members lie along the pawl and entirely inside of the outer face or back of the pawl. This is a protection to the spring and makes it impossible for the spring to slip off of the pawl at either side. It will be seen that it is of great advantage in connection with the fine and accurate mechanism of the herein-described type of apparatus, and especially in connection with the wheels and holding-pawls of the wheels most constantly brought into use, to have a delicate but reliable spring for such pawl, and this is given by the long spring-wire side members of my holding-spring operatively connected to the pawl near its outer end. Should one of the longitudinal members of this wire spring become broken or weak accidentally or by long use, the remaining number will prevent failure of operation for a considerable time. The opposite ends of the members 15 are coiled on pin 18 on opposite sides of the pawls, the ends of the coiled portions bearing against the frame of the head 2, so as to press the holding-pawls forward. These wire springs arranged as described last longer and are for some other reasons preferable to the flat springs. I do not limit myself to the use of both forms of spring conjointly nor to the use of notches 17, although these are preferred.

I will now describe the improved wheel-operating device above referred to. In Figs. 1, 2, and 3 the frame of the head 2 is shown with lateral extensions 19, in which are supported two rods or pins 20 21. On pin 20 is pivoted a lever 22, preferably U-shaped in cross-section and having a curved extension or bearing 23 in position to engage the stop-pin 21. Near the upper end of part 22 is pivoted a pawl 24, adapted to engage the teeth 13 for advancing the printing-wheel adjacent to which the pawl stands, said pawl being pressed toward the wheel by the coiled spring 25 on the pivot 26 of the pawl. Preferably the upper end of lever 22 is extended beyond the pivot inclining toward it, as at 27. This partly covers the spring and forms a convenient part to press upon when moving the device by pressing the finger against it. The pivoted end of pawl 24 is slotted, as most clearly seen in Fig. 4, spring 25 surrounding the pivot within said slot. A spring 25' on the pivot of arm 22 presses said arm against its stop-pin 21. The lever 22 is adapted to slide on its pivot-pin so as to stand directly beside either printing-wheel which it is desired to advance to any desired point arbitrarily. Consequently said wheels may be advanced in any desired order and extent by this single device, which in the complete machine is in position to be reached and operated directly by the hand of the operator. The pawl when thus operated advances its wheel by a single tooth or step or by a succession of equal steps when the operator presses on lever 22 more than once.

In case the numbering-head employed has not a frame with extensions 19, as above described, the pivot-pin 20 and stop-pin 21 may be supported in the flanges 6 7 of plate 4, as indicated in Fig. 5.

28 is an ordinary ink-pad-holding device, 29 being links pivoted thereto at 30 for throwing back the pad.

Means may be provided to insure that pawl 24 on lever 22 shall come to rest in exact alinement with the desired ratchet-wheel. For example, rod 20 may be provided with notches 20$^a$, spaced in accordance with the wheels, lever 22 carrying a yielding spring 20$^b$, the angle end of which drops into a notch just as the pawl is in operative position. Said spring should not be strong enough to make movement of arm 22 difficult, but strong enough to give a distinct tendency to stop the arm at each notch.

The printing-wheels or some of them are provided with devices known in the art as "drop-ciphers." According to the present improvement each wheel having such cipher has a section removed from the periphery to the axis-opening, as most clearly shown in Fig. 7. Preferably said opening has side extensions 32 on opposite sides of the opening, said extensions 32 extending only part way through the body of the wheel—that is, said extensions are merely depressions in the wheel-body. Within the opening is a floating drop-cipher block 33, having at its outer end bevels 34, carefully fitted to corresponding bevels 35 in the body of the wheel. On each side of block 33 are thin wings 36, adapted to rest within depressions 32, the latter being considerably larger than the wings 36. Block 33 also has an arm coöperating with axis 37, having a groove 38, in well-known manner. It will be seen that the cipher-block is neither pivoted nor carefully guided within its socket, and that the only careful fitting required is at the bevels 34 35, and that no force or skill is required to put the blocks in position. Block or section 33 is retained in the recess, but is otherwise disconnected from the body of the wheel.

When the printing-wheels are placed side by side on the axis or when ratchet-wheels are secured to the printing-wheels, the cipher-blocks are kept from falling from their openings. In Fig. 7 the position of such a ratchet-wheel is indicated in dotted lines.

The modifications indicated in Figs. 10 and 11 differ from the form described only in that the extensions of the opening in the wheel extend entirely through the body of the wheel and the wings 36' of the block have the same thickness as the wheels.

In my patented machine above referred to the "No." printing-plate used in the typographic number-head and forming a part of the wheel-advancing device is, when in the hand-machine frame, also used in advancing the wheels, being connected to the lever which operates the ink-pad holder. In the present case said "No." plate is not shown, being omitted by reason of the non-automatic device shown for advancing the wheels; but evidently it is not essential that all of the wheels be moved by the said non-automatic device, in which case the "No." plate and the connection shown in said patent might be retained for moving some of the printing-wheels.

I claim—

1. The combination in a numbering-machine, of a plurality of printing-wheels, an axis, and a step-by-step operating-pawl, a lever-support therefor, a single pin on which said lever is mounted, on which it can turn, and also move longitudinally of the pin, said lever and pawl being movable to advance either wheel one tooth only at a time, said lever forming a hand operating device carrying the pawl.

2. The combination, in a numbering or similar machine, of a plurality of printing-wheels, an axis, a single pawl for advancing said wheels, a spring pressing the pawl toward the printing-wheel adjacent to which it stands, a body to which the pawl is pivoted, said pawl and body being directly hand-operated, a support on which said body is adapted to slide, a spring normally retracting said body and pawl, and a stop for said body.

3. The combination in a numbering-machine of a plurality of rotatable printing-wheels, a common means for advancing the wheels in any desired order and step by step to any extent, said means consisting of pawl 24, body 22, a pivot-pin 20 on which body 22 can turn and also slide longitudinally of the pin, and the stop-pin 21 for said body.

4. The combination of numbering-wheels, a pawl 24 having the forked end, the body 6, U shape in cross-section, into which said forked end enters, a pivot therein for the pawl, a spring on the pivot pressing the pawl forward, the pivot-pin 20 on which the body can turn and along which it can slide, and a spring on said pin normally retracting the pawl and body.

5. The combination of numbering-wheels, a pawl 24 having the forked end, the body 6, U shape in cross-section, into which said forked end enters, a pivot therein for the pawl, a spring on the pivot pressing the pawl forward, the pivot-pin 20 on which the body can turn and along which it can slide, a spring on said pin normally retracting the pawl and body, and stop-pin 21 parallel with pin 20.

6. A printing-wheel for numbering and similar machines having an opening from its periphery to its axis-opening, side extensions to said opening, and a drop-cipher block having supporting-wings, smaller than said extensions to the opening, adapted to rest loosely in said extensions, the drop-cipher block being held in said opening but otherwise disconnected from the wheel, as set forth.

7. A printing-wheel for numbering and similar machines having an opening from its periphery to its axis-opening, side extensions to said opening extending but partly through the wheel, and a non-pivoted drop-cipher block having supporting-wings, smaller than said extensions to the opening, adapted to rest loosely in said extensions, the drop-cipher block being disconnected from the wheel but held in said opening, as set forth.

8. A printing-wheel, for numbering and similar machines, having an opening from the periphery to the axis-opening of the wheel, overhanging bevels on opposite sides of the opening at the periphery of the wheel, a non-pivoted freely-moving drop-cipher block in said opening, and disconnected from the body of the wheel, said block having bevels at its outer end corresponding to said undercut bevels, whereby the loose detached cipher-block will be exactly guided into position at the end of its outward movement.

9. The combination, in a numbering or similar machine, of one or more rotatable printing-wheels, a holding-pawl for each wheel, a pivot for the pawl or pawls, a wire spring for each pawl having duplex longitudinal members nearly as long as the pawl, and a transverse connecting member bearing on the free end of its pawl, the other ends of the longitudinal members of the spring being wound on the pivot of the pawl, on opposite sides of the pawl, as set forth.

10. The combination, in a numbering or similar machine, of one or more rotatable printing-wheels, a holding-pawl for each wheel, a pivot for the pawl or pawls, a notch in the pawl near its free end, a wire spring for each pawl having duplex longitudinal members, and a transverse connecting member bearing on the free end of its pawl in said notch, the other ends of the longitudinal members of the spring being wound on the pivot of the pawl, on opposite sides of the pawl, as set forth.

11. In a numbering-machine, rotatable printing-wheels, holding-pawls for all of said wheels, a pivot for the pawls, a wire spring, or wire springs, for one or more of said pawls, each of such springs having two longitudinal members nearly as long as its pawl, a transverse member connecting the outer ends of the longitudinal members, and itself resting in a notch near the outer end of its pawl, whereby the body of the wire spring is lowered below the outer side of its pawl, and is protected from accidental bending, the unconnected ends of such spring being wound on the pivot of its pawl on opposite sides of the pawl, as set forth.

12. The combination, in a numbering or similar machine, of a plurality of printing-wheels, an axis, a pawl for advancing said wheels, a body to which the pawl is pivoted, a pivotal support for said body parallel with the axis and on which said body is adjustable lengthwise of the support and axis, and means for causing the pawl to stop in exact alinement with the desired ratchet-wheel.

13. A printing-wheel having a recess, and a non-pivoted drop-cipher block therein disconnected from the body of the wheel and being loose in the recess adapted to move toward and from the periphery of the wheel and also to move slightly sidewise in the plane of the wheel in the recess, said wheel having undercut guiding-bevels, and said block having corresponding coöperating bevels at its outer side, whereby as the block is moved outwardly in the recess it is accurately guided forward or backward into position as necessary and arrested by said bevels.

14. A printing-wheel having a recess, and a non-pivoted drop-cipher block therein disconnected from the body of the wheel and held in the recess loosely whereby it can move to and from the periphery of the wheel in the recess and can move slightly sidewise in the plane of the wheel, and shoulders for arresting the block in exact printing position.

15. A printing-wheel having a recess, a floating drop-cipher block in the recess, and shoulders for guiding the block into position and arresting it.

In testimony whereof I have signed this specification in the presence of two subscribing witnesses.

EDWIN G. BATES.

Witnesses:
HENRY C. WARE,
CARRIE E. WYLIE.